(12) United States Patent
Yuan (10) Patent No.: US 10,498,801 B2
(45) Date of Patent: Dec. 3, 2019

(54) TRANSMITTING AND DISPLAYING SCREEN CONTENT

(71) Applicant: Alibaba Group Holding Limited, Grand Cayman (KY)

(72) Inventor: Zhijun Yuan, Hangzhou (CN)

(73) Assignee: Alibaba Group Holding Limited, Cayman Islands (KY)

(*) Notice: Subject to any disclaimer, the term of this patent is extended or adjusted under 35 U.S.C. 154(b) by 192 days.

(21) Appl. No.: 14/582,544

(22) Filed: Dec. 24, 2014

(65) Prior Publication Data

US 2015/0188998 A1 Jul. 2, 2015

(30) Foreign Application Priority Data

Dec. 27, 2013 (CN) .......................... 2013 1 0741237

(51) Int. Cl.
*G06F 15/16* (2006.01)
*H04L 29/08* (2006.01)
(Continued)

(52) U.S. Cl.
CPC ............ *H04L 67/10* (2013.01); *G06F 3/1454* (2013.01); *H04L 65/1093* (2013.01);
(Continued)

(58) Field of Classification Search
CPC ....................................................... H04L 67/10
(Continued)

(56) References Cited

U.S. PATENT DOCUMENTS 8,364,130 B2 1/2013 Moliner et al.
2002/0023265 A1* 2/2002 Metcalf ............... H04L 12/2803
725/74
(Continued)

FOREIGN PATENT DOCUMENTS

CN 102325144 A 1/2012
JP 201015277 7/2010
(Continued)

OTHER PUBLICATIONS

PCT Search Report and Written Opinion dated Mar. 19, 2015 for PCT Application No. PCT/US14/72360, 10 Pages.
(Continued)

*Primary Examiner* — Kevin T Bates
*Assistant Examiner* — Clarence D McCray
(74) *Attorney, Agent, or Firm* — Lee & Hayes, P.C.

(57) ABSTRACT

A projecting terminal and a displaying terminal use a point-to-point connection interface provided by a web-based operating system (OS) to establish a point-to-point communication link. The projecting terminal uses a screen visiting interface provided by the web-based OS to access a screen content, converts the screen content into screen content data in real-time, and transmits the screen content data through the communication link. The displaying terminal receives the screen content data and uses a content displaying control provided by the web-based OS to display the screen content data onto a screen. The present techniques enable two devices that are equipped with the web-based OS to implement screen projecting, expand the usage of the screen projecting technology, and are easy for implementation.

20 Claims, 5 Drawing Sheets

(51) Int. Cl.
*H04L 29/06* (2006.01)
*G06F 3/14* (2006.01)

(52) U.S. Cl.
CPC .............. *H04L 65/60* (2013.01); *H04L 67/02* (2013.01); *H04L 67/38* (2013.01); *H04L 65/4069* (2013.01)

(58) Field of Classification Search
USPC .......................................................... 709/203
See application file for complete search history.

(56) References Cited

U.S. PATENT DOCUMENTS

| | | | |
|---|---|---|---|
| 2002/0038346 A1 | 3/2002 | Morrison et al. | |
| 2006/0168532 A1* | 7/2006 | Stevens .................. | G06Q 10/06 715/753 |
| 2009/0119602 A1 | 5/2009 | Nishiyama | |
| 2009/0137275 A1 | 5/2009 | Amirmokri | |
| 2011/0126130 A1 | 5/2011 | Lieb et al. | |
| 2011/0173256 A1* | 7/2011 | Khalatian ............... | G06F 3/038 709/203 |
| 2011/0234896 A1* | 9/2011 | Ivashin ................ | H04N 9/3147 348/445 |
| 2011/0252071 A1* | 10/2011 | Cidon .................... | G06F 16/178 707/802 |
| 2011/0276619 A1 | 11/2011 | Khan et al. | |
| 2013/0113833 A1 | 5/2013 | Larsson | |
| 2013/0229424 A1* | 9/2013 | Slobodin ............... | G06F 3/1415 345/531 |
| 2013/0290982 A1 | 10/2013 | Beilis et al. | |
| 2013/0328997 A1* | 12/2013 | Desai ..................... | H04N 7/141 348/14.02 |
| 2013/0332857 A1 | 12/2013 | Kim et al. | |
| 2014/0040360 A1 | 2/2014 | Privat | |
| 2014/0053182 A1* | 2/2014 | Jaager ............. | H04N 21/41415 725/25 |
| 2014/0063174 A1* | 3/2014 | Junuzovic ............ | G06Q 10/101 348/14.02 |
| 2014/0086105 A1* | 3/2014 | Kang ...................... | H04L 67/26 370/259 |
| 2015/0019627 A1* | 1/2015 | Jung ....................... | H04L 67/06 709/203 |
| 2016/0134659 A1* | 5/2016 | Reddy .................... | H04L 63/20 726/1 |

FOREIGN PATENT DOCUMENTS

| | | |
|---|---|---|
| JP | 2010157005 A | 7/2010 |
| WO | WO2013103726 | 7/2013 |

OTHER PUBLICATIONS

The Extended European Search Report dated Aug. 9, 2017 for European patent application No. 14873649.9, 9 pages.
Search Report from China Patent Office for Application No. 201310741237, dated Aug. 23, 2017, a counterpart foreign application of U.S. Appl. No. 14/582,544, 1 page.
The Japanese Office Action dated Dec. 4, 2018 for Japanese Patent Application No. 2016532120, a counterpart of U.S. Appl. No. 14/582,544, 13 pages.
Translated Office Action from China Patent Office for Application No. 201310741237, dated Sep. 1, 2017, a counterpart foreign application of U.S. Appl. No. 14/582,544, 17 pages.
Translated Office Action from China Patent Office for Application No. 201310741237, dated Feb. 24, 2018, a counterpart foreign application of U.S. Appl. No. 14/582,544, 8 pages.
Manson, "Getting Started with WebRTC", accessed at <<https://web.archive.org/web/20130906154247with>>, Packt Publishing, Birhimham, UK, Sep. 6, 2013, 114 pages.
Search report from Japan Patent Office for Application No. 2016-532120, dated Nov. 19, 2018, a counterpart foreign application of U.S. Appl. No. 14/582,544, 1 page.
Ilya Grigorik, "High Performance Browser Networking," Copyright © 2013 Ilya Grigorik. Published by O'Reilly Media, Inc. Licensed under CC BY-NC-ND 4.0., 5 pages. https://hpbn.co/.
The Japanese Office Action dated Jun. 11, 2019 for Japanese Patent Application No. 2016-532120, a counterpart of U.S. Appl. No. 14/582,544, 10 pages.
Japanese Office Action dated Jun. 11, 2019 for Japanese Patent Application No. 2016-532120, a counterpart of U.S. Appl. No. 14/582,544, 10 pages.

\* cited by examiner

TRANSMITTING AND DISPLAYING SCREEN CONTENT

CROSS REFERENCE TO RELATED PATENT APPLICATION

This application claims foreign priority to Chinese Patent Application No. 201310741237.0 filed on 27 Dec. 2013, entitled "Method and Apparatus for Transmitting and Displaying Screen Content Based on web-Based OS Operating Environment," which is hereby incorporated by reference in its entirety.

TECHNICAL FIELD

The present disclosure relates to the field of screen projecting technology, and, more particularly, to a method for transmitting and displaying a screen content based on a web-based operating system (OS) operating environment. The screen content includes images or videos. The present disclosure also provides an example method for transmitting the screen content based on the web-based OS operating environment and a corresponding example method for displaying the screen content based on the web-based OS operating environment. The present disclosure also provides an example apparatus for transmitting and displaying the screen content based on the web-based operating system (OS) operating environment.

BACKGROUND

Electronic devices with screens have been widely used in our daily lives and business environments. To fully leverage different screens, screen contents are often shared. Common methods for sharing the screen contents include a screen sharing technology, a screen mapping technology, and a screen projecting technology. The screen projecting technology refers to a technology that projects a currently displayed content at one display screen onto another one or more display screens through certain methods or apparatuses. The screen projecting technology is popular and often used in the fields of projector or smart terminal devices. The screen projecting technology includes two processes. A first process is a data transmission process to transmit screen content data at a first screen to a second screen. A second process is to display the received screen content data at the second screen. The two processes form a complete screen projecting process. In the present disclosure, for the purpose of clarity, the screen projecting is referred to as screen content transmission and display, in which in the first process is referred to as a screen content transmission and the second process is referred to as a screen content display.

Previously screen projecting needed a special data line to connect two devices that share the screen and use the data line to transmit the screen content data. With the development of the network, electronic devices generally have capabilities to become nodes of a network. Thus, using the network to directly share the screen contents becomes possible.

Under the existing technology, a method for using the network to implement screen projecting is mainly through a mobile device to wirelessly project a screen content of the mobile device to a screen of a particular large-screen device that is within a same local area network of the mobile device. For example, an Apple™ device (such as an iPad™ iPhone™, iPod™, or iMac™) projects its screen to a screen of Apple™ TV through WiFi. A Xiaom mobile device, iOS™ device, or PC projects its screen to a screen of Xiaomi TV which is connected within the same local area network, or projects its screen to a Xiaomi box and then the Xiaomi box transmits the screen content data to the Xiaomi TV.

The pitfall of the existing technology is that the connection between the devices needs support of specialized software and thus such connection lacks universality. For example, the screen projecting from an Apple™ mobile device to the Apple™ TV is limited to particular Apple™ products and based on proprietary protocol. The screen projecting from Xiaomi mobile device or iOS™ mobile device to the Xiaomi box or Xiaomi TV needs installing proprietary Xiaomi software and only supports screen projecting between Android™ or iOS™ mobile devices and Xiaomi box. To implement such screen projecting, a specialized application needs downloading and installing. Such specialized application often requires purchase and adjustment after downloading. Thus, the existing technology has a high threshold for usage.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-executable instructions as permitted by the context above and throughout the present disclosure.

The present disclosure provides an example method for transmitting and displaying screen content based on a web-based operating system (OS) operating environment to solve the problems of the existing screen projecting technology.

The present disclosure provides an example method for transmitting and displaying a screen content based on the web-based OS operating environment, which may include the following operations.

A projecting terminal and a displaying terminal use a point-to-point connection interface provided by a web-based OS to establish a point-to-point communication link. The projecting terminal uses a screen visiting interface provided by the web-based OS to access a screen content, converts the screen content into screen content data in real-time, and transmits the screen content data through the communication link.

The displaying terminal receives the screen content data and uses a content displaying control provided by the web-based OS to display the screen content data onto a screen.

Optionally, prior to implementing the step of establishing the point-to-point communication link between the projecting terminal and the displaying terminal, the example method may include the following operations. An original web-based OS operating environment embedded in the projecting terminal visits a web server through a uniform resource locator (URL), loads computer-readable codes or logical codes from the web server, and executes computer-executable codes relating to registration and initialization of the projecting terminal. An original web-based OS operating environment embedded in the displaying terminal visits the web server through the URL, loads computer-readable codes or logical codes from the web server, and executes computer-executable codes relating to registration and initialization of the displaying terminal.

Optionally, the projecting terminal and the displaying terminal, through a liaison of the web server, establish the point-to-point communication link through their respective registration information.

Optionally, the web-based OS operating environment is a HyperText Markup Language (HTML) 5 operating environment with a web Real-Time Communication (WebRTC) application.

Optionally, the point-to-point communication link established through the point-to-point interface provided by the projecting terminal and displaying terminal that use the web-based OS is established through an RTCPeerConnection interface Optionally, the screen visiting interface provided by the web-based OS and used by the projecting terminal to access the screen content is implemented through a MediaStream interface of WebRTC.

Optionally, the content displaying control used by the displaying terminal is a video control of HTML 5.

Optionally, before the displaying terminal receives the screen content data and uses the content displaying control provided by the web-based OS to display the screen content data onto the screen, the example method may further include the following operations.

The web-based OS operating environment embedded in the displaying terminal selects one resolution to display the screen content data. The resolution may include a screen resolution of the displaying terminal, a screen resolution of a sending terminal such as the projecting terminal, or a self-defined screen resolution.

Optionally, in the step that the projecting terminal and the displaying terminal use the point-to-point connection interface provided by the web-based OS to establish the point-to-point communication link, the communication link may include at least one of the following: a wired communication link in a local area network (LAN), a wireless communication link established through WiFi or Bluetooth in the LAN, and a remote point-to-point communication link established through the Internet.

The present disclosure also provides an example method for transmitting a screen content based on a web-based OS operating environment, which may include the following operations.

A point-to-point communication link is established with a displaying terminal through a point-to-point connection interface provided by the web-based OS. A screen visiting interface provided by the web-based OS is used to access the screen content, to convert the screen content into screen content data in real-time, and to transmit the screen content data to the displaying terminal through the communication link.

Optionally, prior to implementing the step of establishing the point-to-point communication link with the displaying terminal, the example method may include the following operations. An originally embedded web-based OS operating environment visits a web server through a uniform resource locator (URL), loads computer-readable codes or logical codes from the web server, executes computer-executable codes relating to initialization of the projecting terminal, and completes registration at the web server.

Optionally, the registration at the web server may include the following operations. Through the web-based OS operating environment that completes initialization, registration-related information of a device is obtained and uploaded to the web server to complete the registration.

Optionally, the step of establishing the point-to-point communication link with the displaying terminal through the point-to-point communication interface provided by the web-based OS may include the following operations. The embedded web-based OS operating environment defines a new RTCPeerConnection interface and completes an initialization of the RTCPeerConnection interface. The embedded web-based OS operating environment sends a point-to-point connection request message to the displaying terminal After a responding message from the displaying terminal is received, computer-executable codes relating to the RTCPeerConnection interface are executed to establish the point-to-point communication link with the displaying terminal.

Optionally, a process for reading and sending the screen content data may include the following operations. The embedded web-based OS operating environment defines and initializes a new MediaStream interface and uses the MediaStream interface to read the screen content data of a current screen. The embedded web-based OS operating environment runs the WebRTC and adds the obtained screen content data of the current screen to the RTCPeerConnection interface. The RTCPeerConnection interface is provided to send the screen content data to the displaying terminal through the point-to-point communication link.

The present disclosure also provides an example method for displaying a screen content based on a web-based OS operating environment, which may include the following operations.

A point-to-point communication link is established with a displaying terminal through a point-to-point connection interface provided by a web-based OS. Received screen content data is displayed onto a screen by using a content display control provided by the web-based OS.

Optionally, prior to implementing the step of establishing the point-to-point communication link with the projecting terminal, the example method may include the following operations. An originally embedded web-based OS operating environment visits a web server through a uniform resource locator (URL), loads computer-readable codes or logical codes from the web server, executes computer-executable codes relating to initialization of the displaying terminal, and completes registration at the web server.

Optionally, the registration at the web server may include the following operations. Through the web-based OS operating environment that completes initialization, registration-related information of a device is obtained and uploaded to the web server to complete the registration.

Optionally, the step of establishing the point-to-point communication link with the projecting terminal through the point-to-point communication interface provided by the web-based OS may include the following operations. The embedded web-based OS operating environment defines a new RTCPeerConnection interface and completes an initialization of the RTCPeerConnection interface. The embedded web-based OS operating environment receives a point-to-point connection request message from the projecting terminal, returns a responding message to the projecting terminal, and then executes computer-executable codes relating to the RTCPeerConnection interface to establish the point-to-point communication link with the projecting terminal.

Optionally, the step of displaying the received screen content data onto the screen by using the content display control provided by the web-based OS may include the following operations. The embedded web-based OS operating environment defines and initializes a new video control. The screen content data received from the RTCPeerConnection interface is obtained through the video control. The embedded web-based OS operation environment selects one resolution. The resolution may include a screen resolution of the displaying terminal, a screen resolution of a sending terminal such as the projecting terminal, or a self-defined screen resolution. The video control displays the screen content data onto the screen of the displaying terminal according to the selected screen resolution.

The present disclosure also provides an example apparatus for transmitting and displaying a screen content based on a web-based OS operating environment. The apparatus may include a communication link establishing unit, a screen content data converting unit, and a screen content data displaying unit.

The communication link establishing unit establishes a point-to-point communication link through a point-to-point communication interface provided by a web-based OS between a projecting terminal and a displaying terminal.

The screen content data converting unit, when the projecting terminal uses a screen visiting interface provided by the web-based OS to access the screen content, converts the screen content into screen content data in real-time, and send the screen content data through the point-to-point communication link.

The screen content displaying unit, when the displaying terminal receives the screen content data, uses a content displaying control provided by the web-based OS to display the screen content data onto a screen.

Optionally, the apparatus may further include a registration initializing unit. The registration initializing unit may include a server connecting sub-unit and a registration initializing sub-unit.

The server connecting sub-unit establishes a connection between the displaying terminal or the project terminal and the web server respectively through the embedded web-based OS operating environments.

The registration initializing sub-unit, when the projecting terminal or the displaying terminal visits the web server through a URL by using their respectively embedded we-based OS, loads computer-readable codes or logical codes that are required for registration and initialization of the projecting terminal or the displaying terminal from the web server respectively, and executes the computer-executable codes relating to registration and initialization.

Optionally, the apparatus may further include a screen resolution selecting unit that selects one resolution to display the screen content data under the web-based OS operating environment embedded at the displaying terminal. The resolution may include a screen resolution of the displaying terminal, a screen resolution of a sending terminal such as the projecting terminal, or a self-defined screen resolution.

The present techniques have at least the following technical advantages. The present techniques may be applied universally. As the present techniques are based on generally embedded web-based OS operating environment without relying on any specialized support software, the present techniques have universality and may implement screen projecting between various types of electronic devices. In addition, the present techniques significantly lower an application threshold. The present techniques implement screen projecting between various types of electronic devices without installing specialized support software, significantly lower a threshold for screen projecting devices so that a majority of devices may use the present techniques to implement screen projecting. As the present techniques do not require any specialized support software, the present techniques also significantly lower a threshold for general users so that more users may use the present techniques.

Moreover, under the present techniques, the devices for screen projecting may be connected via wired or wireless connection in the LAN or the Internet, thereby increasing a projecting range of the screen projecting and a use range of the screen projecting technology. The present techniques do not require purchasing particular projecting devices or installing specialized software, and thus also have low implementation cost.

DETAILED DESCRIPTION

The following descriptions provide many specific details to help understand the present disclosure. The present disclosure, however, may be implemented in many methods other than those described herein. One of ordinary skill in the art may make similar alternatives without violating the present disclosure. Thus, the present disclosure is not restricted by the descriptions herein.

Figure 1:
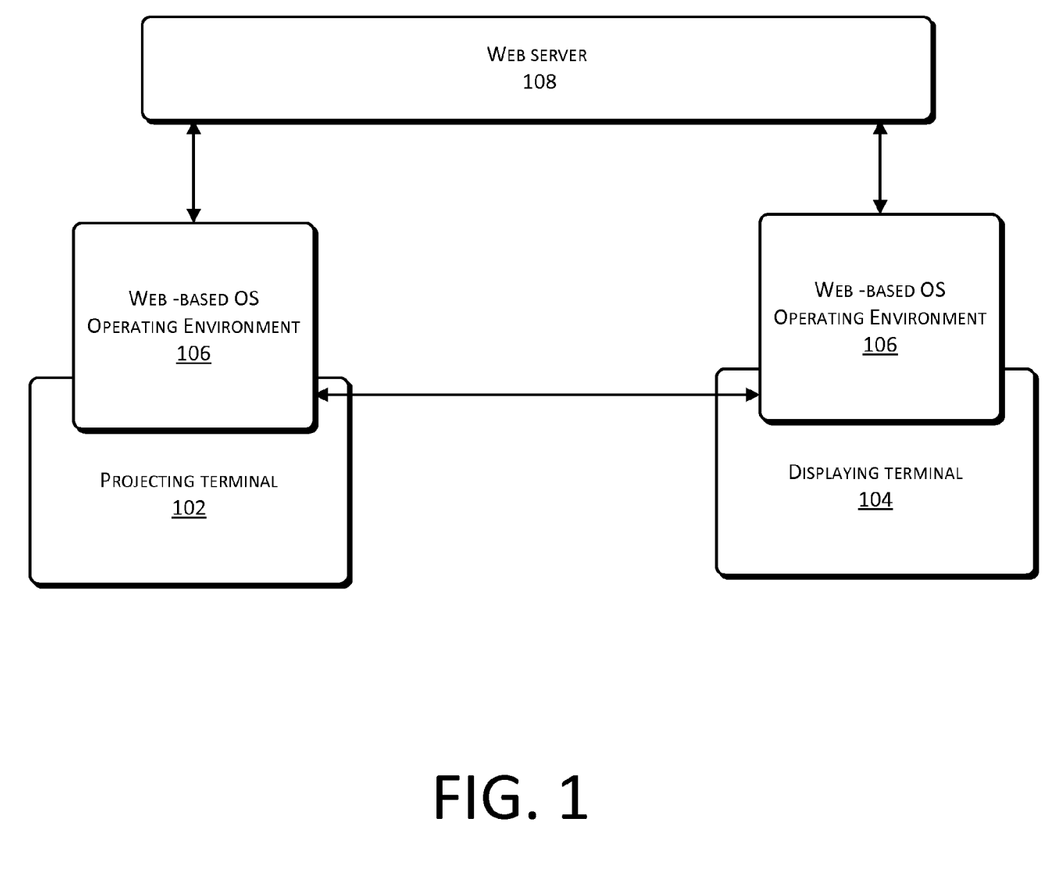
FIG. 1 is a diagram of an example system for transmitting and displaying a screen content based on a web-based OS operating environment according to a first example embodiment of the present disclosure.

FIG. 1 is a diagram of an example system for transmitting and displaying a screen content based on a web-based OS operating environment according to a first example embodiment of the present disclosure.

The present disclosure provides an example method for transmitting and displaying a screen content based on the web-based OS operating environment, which may include the following operations.

A projecting terminal 102 and a displaying terminal 104 use a point-to-point connection interface provided by a web-based OS 106 to establish a point-to-point communication link via a liaison of a web server 108. The projecting terminal 102 uses a screen visiting interface provided by the web-based OS operating environment 106 to access a screen content, sends the screen content data to the displaying terminal 104 through the communication link. The displaying terminal 104 receives the screen content data, uses a content displaying control provided by the web-based OS operating environment 106 to select screen resolution and displays the screen content data onto a screen of the displaying terminal 104.

It should be noted that the web server 108 includes computer programs that reside on a certain type of computer on the Internet. The programs may provide documentation to a browser that sends a request, and provide various Internet services such as WWW, Email, and FTP to a web browser (client). The web server is a passive program that the web server will respond when the web browser (client) running on another computers on the Internet sends the request. When the web browser (client) connects to the web server 108 and requests a file, the web server 108 will process the request and return the file to the web browser (client) with attached information that informs the web browser (client) how to view the file (i.e., the file type).

Further, the projecting terminal 102 and the displaying terminal 104 have the above web browser (client) in order to establish a connection with the web server 108. In this example embodiment, the web browser (client) is the web-based OS operating environment 106 embedded in the projecting terminal 102 and displaying terminal 104. The web-based OS operating environment 106 is an operating system based on carrying and executing computer-executable codes at the web. The web-based OS has a variety of implementations. One feasible technical plan is developed based on the HTML5 technology and such web-based OS operating environment supports the HTML5 features, particularly a technology in HTML5 that supports the web browser for real-time voice or video communication such as WebRTC technology.

Figure 2:
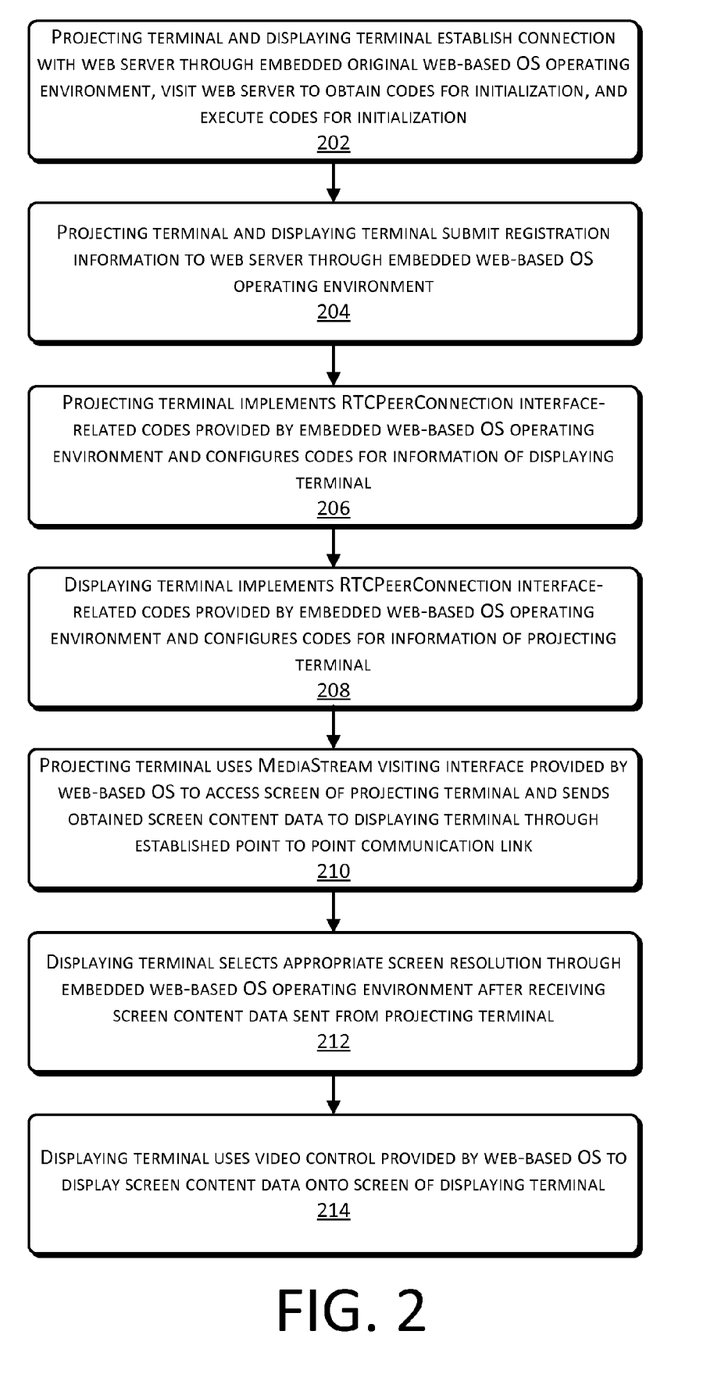
FIG. 2 is a flowchart of an example method for transmitting and displaying the screen content based on the web-based OS operating environment according to the first example embodiment of the present disclosure.

FIG. 2 is a flowchart of an example method for transmitting and displaying the screen content based on the web-based OS operating environment according to the first example embodiment of the present disclosure.

At 202, a projecting terminal and a displaying terminal establish a connection with a web server through their embedded original web-based OS operating environment, visit the web server to obtain computer-executable codes (codes) for initialization, and execute the codes for initialization.

It should be noted that information communication between the web server and the web browser (client) is conducted through Hypertext transfer protocol (HTTP). In order to access the web server to obtain information, the web browser (client) establishes an HTTP connection with the web server. In this example embodiment, the establishment of HTTP connection between the web-based OS operating environment embedded in the projecting terminal or the displaying terminal and the web server may include the following operations.

(1) The projecting terminal and the displaying terminal establish a physical connection with their respective access routers, such as through dialing. The physical connection may include a wired connection such as cable connectors or a wireless connection such as WIFI or Bluetooth;

(2) The projecting terminal and the displaying terminal obtain their respective IP address through the embedded original web-based OS operating environment.

(3) The projecting terminal and the displaying terminal establish a data link with the router through their respective embedded original web-based OS operating environment.

(4) The projecting terminal and the displaying terminal obtain the IP address of the web server through the embedded original web-based OS operating environment.

(5) The projecting terminal and the displaying terminal establish a TCP connection with the web server through their respective embedded original web-based OS operating environment.

(6) The projecting terminal and the displaying terminal establish a HTTP connection with the web server through their respective embedded original web-based OS operating environment. After this step is completed, the original web-based OS operating environment embedded in the projecting terminal and the displaying terminal may access and exchange information with the web server.

After the connections between the projecting terminal or the displaying terminal and the web server are established, the original web-based OS operating environment embedded in the projecting terminal or the displaying terminal visits the web server, loads computer-readable codes for initialization from the web server, and executes the computer-executable codes for initialization to complete the initialization, which may include the following operations.

The projecting terminal and the displaying terminal send an access request message to the web server. The web server receives the access request message and returns a message that consents to access. After the projecting terminal and the displaying terminal receive the message that consent to access, the original web-based OS operating environment embedded in the projecting terminal and the displaying terminal accesses the web server through a URL, and load computer-readable codes or logical codes for initialization from the web server. The web-based OS operating environment, after loading the computer-readable for initialization, executes the computer-executable codes for initialization and completes the initialization for the projecting terminal and the displaying terminal respectively. After the initialization, the projecting terminal has a complete web-based OS operating environment to implement screen projecting and the displaying terminal also has the complete web-based OS operating environment to display the received screen content data onto a screen.

It should be noted that the embedded original web-based OS operating environment at the projecting terminal and the displaying terminal may be different at different devices. Some projecting terminals or devices may be already embedded with the complete original web-based OS operating environment and may directly implement screen projecting. Alternatively, some displaying terminals or devices may be already embedded with the complete original web-based OS operating environment and may directly display the screen content data onto the screen when receiving the screen content data.

However, some devices may simply have the original web-based OS operating environment that has a basic network connection function, but does not have some complex functions, which may be obtained through accessing to the web server. The above description assumes that the above projecting terminal and displaying terminal only have the original web-based OS operating environment. The above initialization is a process to have the complete web-based OS operating environment based on the original web-based OS operating environment. In this example embodiment, the web-based OS operating environment is a HTML5 operating environment. This operating environment needs to support a WebRTC architecture component. WebRTC is an acronym of web Real-Time Communication, or may be called real-time webpage communication. The WebRTC architecture component supports real-time voice or video communication between web browsers.

At 204, the projecting terminal and the displaying terminal submit registration information to the web server through their embedded web-based OS operating environment respectively.

After the projecting terminal and the displaying terminal have the complete HTML5 environment, the projecting terminal and the displaying terminal may achieve more functions. The purpose of registration is to establish a communication link between the projecting terminal and the displaying terminal through a liaison of the web server. An example registration process is as follows.

At a first step, the projecting terminal and the displaying terminal obtain their own device information respectively. The device information may include an IP address, a device identification, and a screen resolution of the device.

At a second step, the projecting terminal and the displaying terminal send their own device information to the web server through their respective embedded web-based OS operating environment to complete the registration.

At 206, the projecting terminal implements the RTCPeerConnection interface-related codes provided by the embedded web-based OS operating environment and configures the codes for information of the displaying terminal.

The RTCPeerConnection interface is a standard application programming interface (API) for third-party developers provided by the WebRTC architecture component. The API permits the user to establish a direct communication relationship between two running browsers.

An example implementation process that the projecting terminal uses the embedded web-based OS operating environment to execute the RTCPeerConnection interface-related codes and configure the codes for information of the displaying terminal may be as follows.

```
// Establish a connection based on ICE
var peer = new RTCPeerConnection (iceServers, optionalArgument);
// Configure a media data stream
peer.onaddstream = function (event) {
config.onaddstream (event.stream, config.to);
// Configure information of a receiving terminal at the projecting terminal
peer.createOffer (function (sdp) {
peer.setLocalDescription (sdp);
}
```

It should be noted that the RTCPeerConnection interface-related codes and the codes for configuration of the information related to the displaying terminal refer to codes corresponding to a method for establishing a point to point communication link between the projecting terminal and the displaying terminal. In addition, similar codes or alternative codes of the codes described herein may be used to implement the same function (i.e., establishing a point to point communication link between the projecting terminal the displaying terminal). The present disclosure does not impose any restriction.

In addition, it should be noted that an RTCPeerConnection object allows a direct communication between two browsers. The communication is coordinated through a signal path. At the same time, this connection may also be used to transfer voice and video data. In a practical application, requirements of network bandwidth are relatively high when the RTCPeerConnection interface is used to establish the point-to-point communication link to transmit screen content data. For example, the projecting terminal and the displaying terminal may be in the same LAN. Both the projecting terminal and the displaying terminal connect to the same router via a wired connection or WIFI connection. In addition, to reach the greatest extent of the screen projecting image quality and real-time efficiency, an implementation of cloud OS platform may have the best effect. Based on ensuring the image quality and real-time efficiency of the screen projecting, the present techniques may also use other connections. The present disclosure does not impose any restriction.

At 208, the displaying terminal implements the RTCPeerConnection interface-related codes provided by the embedded web-based OS operating environment and configures the codes for information of the projecting terminal.

Corresponding to step 206, an example implementation process that the displaying terminal uses the embedded web-based OS operating environment to execute the RTCPeerConnection interface-related codes and configure the codes for information of the projecting terminal may be as follows.

```
// Establish a connection based on ICE
var peer = new RTCPeerConnection (iceServers, optionalArgument);
// // Configure a media data stream
peer.onaddstream = function (event) {
config.onaddstream (event.stream, config.to);
};
// Configure information of the projecting terminal at the displaying terminal
peer.setRemoteDescription (new RTCSessionDescription (config.sdp));
peer.createAnswer (function (sdp) {
peer.setLocalDescription (sdp);
}
```

It should be noted that, the RTCPeerConnection interface-related codes and the codes for configuration of the information related to the receiving terminal refer to codes corresponding to a method for establishing a point to point communication link between the projecting terminal and the displaying terminal. In addition, similar codes or alternative codes of the codes described herein may be used to implement the same function (i.e., establishing a point to point communication link between the projecting terminal the displaying terminal). The present disclosure does not impose any restriction.

After the implementation of above steps 206 and 208, the establishment of point to point connection link between the projecting terminal and the displaying terminal is completed.

At 210; the projecting terminal uses a MediaStream visiting interface provided by the web-based OS to access a screen of the projecting terminal and sends obtained screen content data to the displaying terminal through the point to point communication link established through the above steps. An example process is as follows.

(1) The projecting terminal uses the MediaStream visiting interface provided by the embedded web-based OS to retrieve current screen content data of the projecting terminal.

An example process for the projecting terminal to retrieve the current screen content data at the projecting terminal is as follows:

```
var constraints = {
    audio: false,
    video: screen_constraints
};
navigator.getUserMedia (constraints, onstream, onerror);
```

After the MediaStream interface retrieves the current screen content data at the projecting terminal, it sends the screen content data to the displaying terminal through the point to point communication link established at the steps 206 and 208.

It should be noted that the MediaStream interface is used to send data stream transmit to a remote node or receives the data stream from the remote node. Further, the MediaStream interface is used as an example method for retrieving the screen content data. Some other interfaces or methods may be used to obtain the screen content data. The present disclosure does not impose any restrictions.

(2) The screen content data is converted to audio and video stream supported by HTML5. In this example embodiment, the screen content data is converted to audio and video stream supported by embedded web-based OS operating environment.

It should be noted that Hypertext Markup Language (HTML) 5 supports the audio and video streams in the formats including but are not limited to OGG format, WEBM format and MP4 format. If the screen image data is audio signal, it may be converted to OGG format. If the screen content data is video signal, it may be converted to WEBM or MP4 format. As some browsers such as IE™ browser does not support WEBM format, while the MP4 format supports both audio and video signal, MP4 format may be the best choice in some examples.

It should be further noted that the current major browsers, including Firefox, Internet Explorer (IE), Google Browser, Maxthon browser, browser 360, and Tencent browser, all support the HTML5 standard and thus supports displaying the audio and video streams support by HTML5.

(3) The MediaStream interface is called by the RTCPeerConnection interface described at the step 208. That is, the MediaStream interface obtains the audio and video stream converted from the screen content data, which is then sent to the displaying terminal through RTCPeerConnection interface.

At 212, after the displaying terminal receives the screen content data sent from the projecting terminal, the displaying terminal selects an appropriate screen resolution through the web-based OS operating environment embedded at the displaying terminal.

After the displaying terminal receives the screen content data from the projecting terminal via the RTCPeerConnection interface, the web-based OS operating environment embedded at the displaying terminal selects a screen resolution selecting to be used at the displaying terminal. The resolution may include a screen resolution of the displaying terminal, a screen resolution of a sending terminal such as the projecting terminal, or a self-defined screen resolution. After the resolution is selected, the next operation is implemented.

At 214, the displaying terminal uses a video control provided by the web-based OS to display the screen content data onto a current screen of the displaying terminal.

The displaying terminal uses a HTML5 video control provided by the web-based OS to display the audio and video streams onto the screen. Example code execution process is as follows:

var video=document.createElement ('video');
video.id='self';
video [?isFirefox 'mozSrcObject': 'src']=isFirefox stream: window.webkitURL.createObjectURL (stream);?
video.autoplay=true;
video.controls=true;

It should be noted that the video control is an example method for displaying the received screen content data onto the current screen of the present disclosure. Other controls or methods may be used to display the screen content data. The present disclosure does not impose any restriction.

The specific codes and environment used in the example embodiment may vary with the development of technology as long as they may implement the transmission and display of the screen content data through communication between the two browsers.

The present disclosure also provides an example method for transmitting the screen content data based on the web-based OS operating environment in a second example embodiment of the present disclosure.

Figure 3:
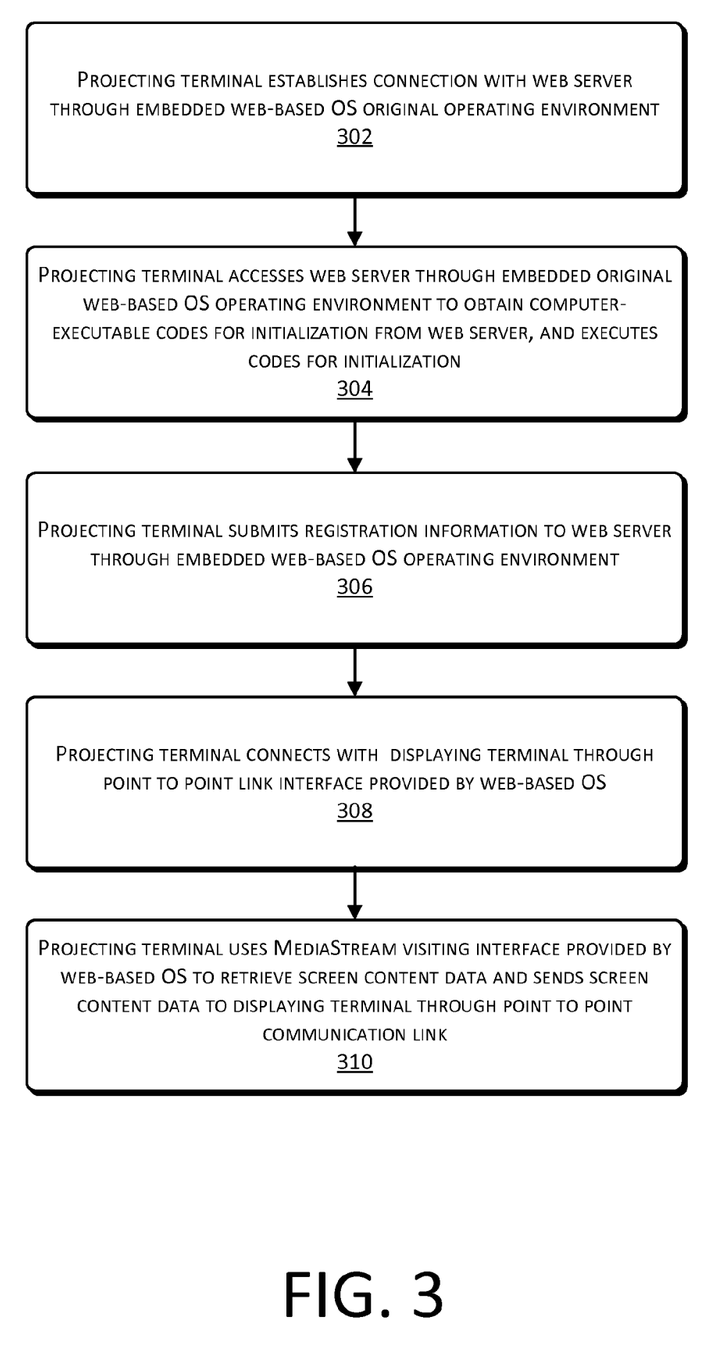
FIG. 3 is a flowchart of an example method for transmitting the screen content at a projecting terminal according to a second example embodiment of the present disclosure.

FIG. 3 is a flowchart of an example method for transmitting a screen content at a projecting terminal according to a second example embodiment of the present disclosure.

At 302, the projecting terminal establishes a connection with the web server through its embedded web-based OS original operating environment.

It should be noted that the web server includes computer programs that reside on a certain type of computer on the Internet. The programs may provide documentation to a browser that sends a request, and provide various Internet services such as WWW, Email, FTP to a web browser (client). The web server is a passive program that the web server will respond when the web browser (client) running on another computers on the Internet sends the request. When the web browser (client) connects to the web server and requests a file, the web server 108 will process the request and return the file to the web browser (client) with attached information that informs the web browser (client) how to view the file (i.e., the file type).

Further, the projecting terminal and the displaying terminal have the above web browser (client) in order to establish a connection with the web server. In this example embodiment, the web browser (client) is the web-based OS operating environment embedded in the projecting terminal and displaying terminal. The web-based OS operating environment is an operating system based on carrying and executing computer-executable codes at the web. The web-based OS has a variety of implementations. One feasible technical plan is developed based on the HTML5 technology and such web-based OS operating environment supports the HTML5 features, particularly a technology in HTML5 that supports the web browser for real-time voice or video communication such as WebRTC technology.

Moreover, the information communication between the web server and the web browser (client) may be conducted through HTTP. In order to access the web server to obtain information, the web browser (client) needs to establish an HTTP connection with the web server. In this example embodiment, the establishment of HTTP connection between the web-based OS operating environment embedded in the projecting terminal and the web server may include the following operations.

(1) The projecting terminal establishes a physical connection with an access router, which may be established through dialing. The physical connection may include a wired connection such as cable connectors or a wireless connection such as WIFI or Bluetooth;

(2) The projecting terminal obtains its IP address through the embedded original web-based OS operating environment.

(3) The projecting terminal establishes a data link with the router through its embedded original web-based OS operating environment.

(4) The projecting terminal obtains the IP address of the web server through their respective embedded original web-based OS operating environment.

(5) The projecting terminal establishes a TCP connection with the web server through its embedded original web-based OS operating environment.

(6) The projecting terminal establishes a HTTP connection with the web server through its embedded original web-based OS operating environment. After this step is completed, the original web-based OS operating environment embedded in the projecting terminal may access and exchange information with the web server.

At 304, the projecting terminal accesses the web server through the embedded original web-based OS operating environment, loads computer-executable codes for initialization from the web server, and executes the computer-executable codes for initialization.

The embedded original web-based OS operating environment at the projecting terminal may be different at different devices. Some projecting terminals or devices may be already embedded with the complete original web-based OS operating environment and may directly implement screen projecting. However, some devices may simply have the original web-based OS operating environment that has a basic network connection function, but does not have some complex functions, which may be obtained through accessing to the web server. The above description assumes that the projecting terminal only has the original web-based OS operating environment.

At first, the projecting terminal sends an access request message to the web server. The web server receives the access request message and returns a message that consents to access to the projecting terminal. After the projecting terminal receives the message that consent to access, the projecting terminal accesses the web server through a URL by using the original web-based OS operating environment embedded in the projecting terminal, and loads computer-readable codes or logical codes for initialization from the web server. The projecting terminal, after loading the computer-readable for initialization, executes the computer-executable codes for initialization and completes the initialization for the projecting terminal. After the initialization, the projecting terminal has a complete web-based OS operating environment to implement screen projecting.

The projecting terminal and the displaying terminal send an access request message to the web server. The web server receives the access request message and returns a message that consents to access. After the projecting terminal and the displaying terminal receive the message that consent to access, the original web-based OS operating environment embedded in the projecting terminal and the displaying terminal accesses the web server through a URL, and load computer-readable codes or logical codes for initialization from the web server. The web-based OS operating environment, after loading the computer-readable for initialization, executes the computer-executable codes for initialization and completes the initialization for the projecting terminal and the displaying terminal respectively. After the initialization, the projecting terminal has a complete web-based OS operating environment to implement screen projecting and the displaying terminal also has the complete web-based OS operating environment to display the received screen content data onto a screen.

At 306, the projecting terminal submits registration information to the web server through the embedded web-based OS operating environment.

After the projecting terminal has the complete HTML5 environment, the projecting terminal may achieve more functions. The purpose of registration is to establish a communication link between the projecting terminal and the displaying terminal through a liaison of the web server. An example registration process is as follows.

At a first step, the projecting terminal obtains its device information. The device information may include an IP address, a device identification, and a screen resolution of the device.

At a second step, the projecting terminal sends its device information to the web server through the embedded web-based OS operating environment to complete the registration.

At 308, the projecting terminal connects with the displaying terminal through the point to point link interface provided by web-based OS.

For example, the point to point link interface describes in this step may be the RTCPeerConnection interface. The RTCPeerConnection interface is a standard API for third-party developers provided by WebRTC architecture component. The API permits the user to establish a direct communication relationship between two running browsers.

An example implementation process that the projecting terminal uses the embedded web-based OS operating environment to execute the RTCPeerConnection interface-related codes and configure the codes for information of the displaying terminal may be as follows.

```
// Establish a connection based on ICE
var peer = new RTCPeerConnection (iceServers, optionalArgument);
// Configure a media data stream
peer.onaddstream = function (event) {
config.onaddstream (event.stream, config.to);
// Configure information of a receiving terminal at the projecting terminal
peer.createOffer (function (sdp) {
peer.setLocalDescription (sdp);
}
```

It should be noted that the RTCPeerConnection interface-related codes and the codes for configuration of the information related to the displaying terminal refer to codes corresponding to a method for establishing a point to point communication link between the projecting terminal and the displaying terminal. In addition, similar codes or alternative codes of the codes described herein may be used to implement the same function (i.e., establishing a point to point communication link between the projecting terminal the displaying terminal). The present disclosure does not impose any restriction.

In addition, it should be noted that an RTCPeerConnection object allows a direct communication between two browsers. The communication is coordinated through a signal path. At the same time, this connection may also be used to transfer voice and video data. In a practical application, requirements of network bandwidth are relatively high when the RTCPeerConnection interface is used to establish the point-to-point communication link to transmit screen content data. For example, the projecting terminal and the displaying terminal may be in the same LAN. Both the projecting terminal and the displaying terminal connect to the same router via a wired connection or WIFI connection. In addition, to reach the greatest extent of the screen projecting image quality and real-time efficiency, an implementation of cloud OS platform may have the best effect. Based on ensuring the image quality and real-time efficiency of the screen projecting, the present techniques may also use other connections. The present disclosure does not impose any restriction.

At 310, the projecting terminal uses the MediaStream visiting interface provided by the web-based OS to retrieve screen content data and sends the screen content data to the displaying terminal through the point to point communication link.

(1) The projecting terminal uses the MediaStream visiting interface provided by the embedded web-based OS to retrieve current screen content data of the projecting terminal. An example process for the projecting terminal to retrieve the current screen content data at the projecting terminal is as follows:

An example process that the projecting terminal uses the MediaStream visiting interface provided by the web-based OS to retrieve the screen content data is as follows.

```
var constraints = {
    audio: false,
    video:screen_constraints
    };
navigator.getUserMedia (constraints, onstream, onerror);
```

After the MediaStream interface retrieves the current screen content data at the projecting terminal, it sends the screen content data to the displaying terminal through the point to point communication link established at the step 308.

The MediaStream interface is used to send data stream transmit to a remote node or receives the data stream from the remote node. It should be noted that the MediaStream interface is used as an example method for retrieving the screen content data. Some other interfaces or methods may be used to obtain the screen content data. The present disclosure does not impose any restrictions.

(2) The screen content data is converted to audio and video stream supported by HTML5. In this example embodiment, the screen content data is converted to audio and video stream supported by embedded web-based OS operating environment.

It should be noted that Hypertext Markup Language (HTML) 5 supports the audio and video streams in the formats including but are not limited to OGG format, WEBM format and MP4 format. If the screen image data is audio signal, it may be converted to OGG format. If the screen content data is video signal, it may be converted to WEBM or MP4 format. As some browsers such as IE™ browser does not support WEBM format, while the MP4 format supports both audio and video signal, MP4 format may be the best choice in some examples.

It should be further noted that the current major browsers, including Firefox, Internet Explorer (IE), Google Browser, Maxthon browser, browser 360, and Tencent browser, all support the HTML5 standard and thus supports displaying the audio and video streams support by HTML5.

(3) The MediaStream interface is called by the RTCPeerConnection interface described at the step 208. That is, the MediaStream interface obtains the audio and video stream converted from the screen content data, which is then sent to the displaying terminal through RTCPeerConnection interface.

The above described specific environment and support situation are just examples. With the developments of technology, the environment and support situation may but it will not influence the substance in the present disclosure.

The present disclosure also provides an example method for displaying screen content data based on the web-based OS operating environment in a third example embodiment of the present disclosure, which is combined with the example method for transmitting the screen content data based on a web-based OS operating environment in the second example embodiment to display the screen content data at a local browser.

Figure 4:
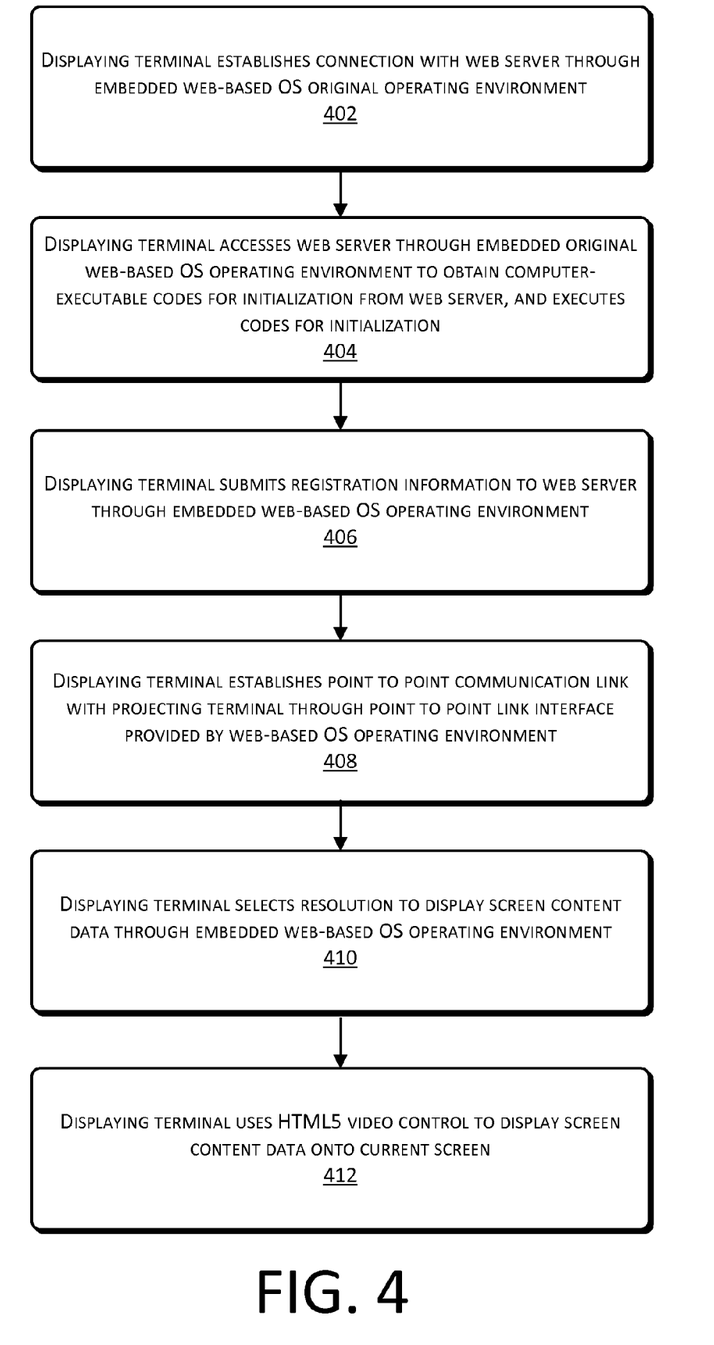
FIG. 4 is a flowchart of an example method for displaying the screen content at a displaying terminal according to a third example embodiment of the present disclosure.

FIG. 4 is a flowchart of an example method for displaying screen content according to a third example embodiment of the present disclosure.

At 402, the displaying terminal establishes a connection with the web server through its embedded web-based OS original operating environment.

Similar to the example process that the projecting terminal establishes a connection with the web server through its embedded web-based OS original operating environment at 302, an example process that the displaying terminal HTTP connection with the web server is as follows.

(1) The displaying terminal establishes a physical connection with an access router, which may be established through dialing. The physical connection may include a wired connection such as cable connectors or a wireless connection such as WIFI or Bluetooth;

(2) The displaying terminal obtains its IP address through the embedded original web-based OS operating environment.

(3) The displaying terminal establishes a data link with the router through its embedded original web-based OS operating environment.

(4) The displaying terminal obtains the IP address of the web server through its embedded original web-based OS operating environment.

(5) The displaying terminal establishes a TCP connection with the web server through its embedded original web-based OS operating environment.

(6) The displaying terminal establishes a HTTP connection with the web server through its embedded original web-based OS operating environment. After this step is completed, the original web-based OS operating environment embedded in the displaying terminal may access and exchange information with the web server.

At 404, the displaying terminal accesses the web server through the embedded original web-based OS operating environment, loads computer-executable codes for initialization from the web server, and executes the computer-executable codes for initialization.

The displaying terminal sends an access request message to the web server through the established connection with the web serve at 402 through its embedded web-based OS operating environment. The web server receives the access request message and returns a message that consents to access to the displaying terminal.

After the displaying terminal receives the message that consent to access, the displaying terminal accesses the web server through a URL by using the original web-based OS operating environment embedded in the displaying terminal, and loads computer-readable codes or logical codes for initialization from the web server. The displaying terminal, after loading the computer-readable for initialization, executes the computer-executable codes for initialization and completes the initialization for the projecting terminal. After the initialization, the displaying terminal has a complete web-based OS operating environment to implement screen projecting.

At 406, the displaying terminal submits registration information to the web server through the embedded web-based OS operating environment.

An example registration process is as follows. At a first step, the projecting terminal obtains its device information. The device information may include an IP address, a device identification, and a screen resolution of the device.

At a second step, the displaying terminal sends its device information to the web server through the embedded web-based OS operating environment to complete the registration.

At 408, the displaying terminal establishes a point to point communication link with the projecting terminal through the point to point link interface provided by web-based OS.

Corresponding to the step 308 in the second example embodiment, for example, the displaying terminal connects with the projecting terminal through the RTCPeerConnection interface provided by web-based OS operating environment as follows.

```
// Establish a connection based on ICE
var peer = new RTCPeerConnection (iceServers, optionalArgument);
// Configure the media data stream
peer.onaddstream = function (event) {
config.onaddstream (event.stream, config.to);
// Configure information of the projecting terminal at the displaying
terminal
peer.createOffer (function (sdp) {
peer.setLocalDescription (sdp);
}
```

It should be noted that the RTCPeerConnection interface-related codes and the codes for configuration of the information related to the displaying terminal refer to codes corresponding to a method for establishing a point to point communication link between the projecting terminal and the displaying terminal. In addition, similar codes or alternative codes of the codes described herein may be used to implement the same function (i.e., establishing a point to point communication link between the projecting terminal the displaying terminal). The present disclosure does not impose any restriction.

After this step 408 and the corresponding step 308 are completed, the point to point communication link between the projecting terminal and the displaying terminal is established.

At 410, after the displaying terminal receives the screen content data from the projecting terminal via the RTCPeerConnection interface, the displaying terminal selects a resolution to display the screen content data through the web-based OS operating environment embedded at the displaying terminal. The resolution may include a screen resolution of the displaying terminal, a screen resolution of a sending terminal such as the projecting terminal, or a self-defined screen resolution. The next step is implemented after the resolution selection.

At 412, the displaying terminal uses a HTML5 video control to display the screen content data onto a current screen.

At first, the displaying terminal receives the audio and video stream sent by the projecting terminal at the step 310 through the RTCPeerConnection interface at the step 408.

The displaying terminal uses the HTML5 Video control provided by the web-based OS to display the audio and video streams onto a screen. An example process is as follows:

var video=document.createElement('video');
    video.id='self';
    video[isFirefox ?'mozSrcObject': 'src']=isFirefox ? stream window.webkitURL.createObjectURL(stream);
    video.autoplay=true;
    video.controls=true;

It should be noted that, the video control is an example for displaying the received screen content data onto the current screen of the present disclosure. Some other controls or methods may be used to display the screen content data. The present disclosure does not impose any restriction.

The present disclosure also provides an apparatus for transmitting and displaying screen content data based on the web-based OS operating environment.

Figure 5:
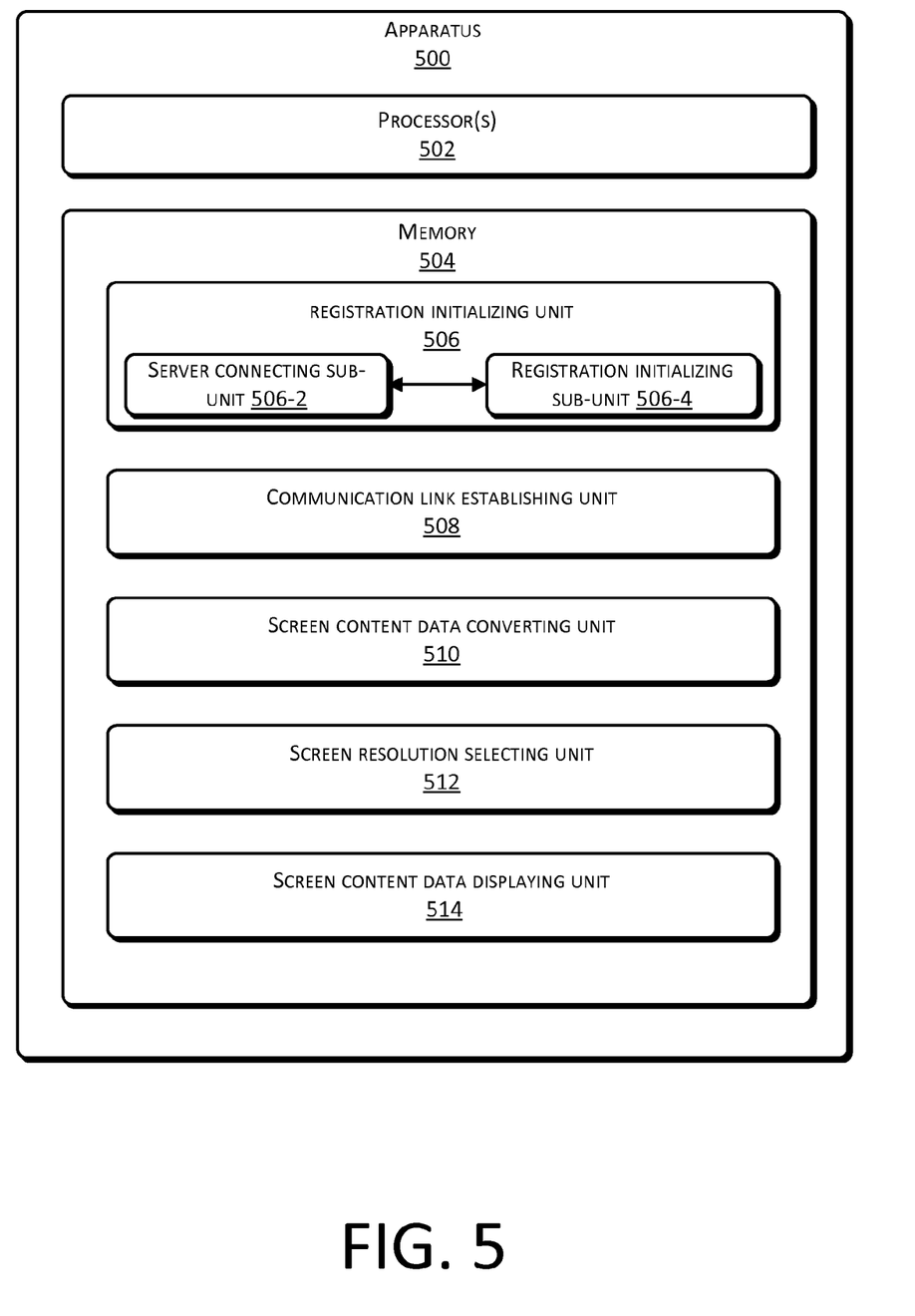
FIG. 5 is a diagram of an example apparatus for transmitting and displaying the screen content based on the web-based OS operating environment according to a fourth example embodiment of the present disclosure.

FIG. 5 is a diagram of an example apparatus 500 for transmitting and displaying the screen content based on the web-based OS operating environment according to a fourth example embodiment of the present disclosure.

The apparatus 500 may include one or more processor(s) 502 or data processing unit(s) and memory 504. The memory 504 is an example of computer-readable media. The memory 504 may store therein a plurality of modules or units including a registration initializing unit 506, a communication link establishing unit 508, a screen content data converting unit 510, a screen resolution selecting unit 512, and a screen content data displaying unit 514.

The registration initializing unit 506 may include a server connecting sub-unit 506-2 and a registration initializing sub-unit 506-4.

The server connecting sub-unit 506-2 establishes a connection between the displaying terminal and/or the project terminal and the web server respectively through the embedded web-based OS operating environments.

For example, the information communication between the web server and the web browser (client) is conducted through HTTP. In order to access the web server to obtain information, the web browser (client) establishes an HTTP connection with the web server.

The registration initializing unit 506-4 may include an initializing sub-unit and a registering sub-unit (not shown in FIG. 5).

After the projecting terminal and the displaying terminal send an access request message to the web server, the web server receives the access request message and sends a message that consent to access to the projecting terminal and the displaying terminal. After the projecting terminal and displaying terminal receive the message that consents to access from the web server, the initializing sub-unit, when the projecting terminal or the displaying terminal visits the web server through a URL by using their respectively embedded we-based OS, loads computer-readable codes or logical codes that are required for registration and initialization of the projecting terminal or the displaying terminal from the web server respectively, and executes the computer-executable codes relating to registration and initialization through the original web-based OS operating environment. After the completion of initialization, the projecting terminal has the complete web-based OS operating environment to implement screen projecting and the displaying terminal has the complete web-based OS operating environment to display the received screen content data onto a screen.

The registering sub-unit obtains device information of the displaying terminal or the projecting terminal through the embedded web-based OS operating environment and sends the device information to the web-server to complete registration. The device information may include an IP address, a device identification, and a screen resolution of the device.

The communication link establishing unit 508 establishes a point-to-point communication link through a point-to-point communication interface provided by a web-based OS between a projecting terminal and a displaying terminal.

For example, the communication link establishing unit 508 implements interface-related codes provided by the embedded web-based OS operating environment and configures the codes for information of the displaying terminal at the projecting terminal. The communication link establishing unit 508 also implements interface-related codes provided by the embedded web-based OS operating environment and configures the codes for information of the projecting terminal at the displaying terminal. After the codes for the projecting terminal and the displaying terminal are executed, the point to point communication link between the projecting terminal and the displaying terminal is established.

The screen content data converting unit 510, when the projecting terminal retrieves the screen content data, converts the screen content into screen content data.

For example, when the projecting terminal obtain the screen content data through the MediaStream visiting interface provided by the web-based OS, the screen content data converting unit 510 converts the screen content data to audio and video streams supported by HTML5. For instance, the screen content data is converted to audio and video streams supported by the embedded web-based OS operating environment and the audio and video stream is then transmitted to the displaying terminal through the RTCPeerConnection interface.

The screen resolution selecting unit 512 selects a resolution to display the screen content data. For example, the screen resolution selecting unit 512, after the displaying terminal receives the screen content data from the projecting terminal via the RTCPeerConnection interface, selects a resolution to display the screen content data under the web-based OS operating environment embedded at the displaying terminal. The selectable screen resolution may include a screen resolution of the displaying terminal, a screen resolution of a sending terminal such as the projecting terminal, or a self-defined screen resolution. For example, after the displaying terminal receives the screen content data from the projecting terminal via the RTCPeerConnection interface, the screen resolution selecting unit 512 selects the screen resolution to display the screen content data at the current screen through the web-based OS operating environment embedded at the displaying terminal.

The screen content displaying unit 514, when the displaying terminal receives the screen content data, display the screen content data onto a screen. For example, the screen resolution displaying unit 514 uses a video control provided by the web-based OS to display the screen content data received from the projecting terminal onto a screen at the displaying terminal. The screen resolution selected to display the screen content data at the displaying terminal is the screen resolution that the screen content data displaying unit 512 selects.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

In a standard configuration, a computing device or system as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

What is claimed is:

1. A method comprising:
registering a projecting terminal at a web server, the registering the projecting terminal at the web server including:
loading computer-executable codes for initialization from the web server to the projecting terminal;
executing the computer-executable codes for initialization at the projecting terminal to establish a web-based operating system (OS) that supports a real-time webpage communication; and
sending device information of the projecting terminal to the web server, the device information of the projecting terminal including an IP address, a device identification, and a screen resolution of the projecting terminal;
establishing a point to point communication link with a displaying terminal through a point to point link interface provided by the web-based OS at the projecting terminal;
using a screen visiting interface provided by the web-based OS to retrieve a screen content;
converting the screen content to screen content data supported by the web-based OS, the converting including:
converting the screen content into an OGG format in response to determining that the screen content is an audio signal; and
converting the screen content into a WEBM format or a MP4 format in response to determining that the screen content is a video signal; and
sending the screen content data to the displaying terminal through the point to point communication link.

2. The method of claim 1, wherein the converting the screen content to the screen content data comprises converting the screen content to the screen content data in real time.

3. The method of claim 1, wherein the registering the projecting terminal at the web server further includes:
prior to the establishing the point to point communication link with the displaying terminal through the point to point link interface provided by the web-based OS, visiting the web server through the web-based OS.

4. The method of claim 1, wherein the registering the projecting terminal at the web server further includes:
uploading registration related information of the projecting terminal to the web server through the web-based OS that completes initialization; and
completing a registration.

5. The method of claim 1, wherein the web-based OS supports HyperText Markup Language (HTML) 5 operating environment with a web Real-Time Communication (WebRTC) application.

6. The method of claim 5, wherein the establishing the point to point communication link with the displaying terminal through the point to point link interface provided by the web-based OS at the projecting terminal comprises:
defining an RTCPeerConnection interface through the web-based OS;
completing an initiation of the RTCPeerConnection interface;
sending a point to point connecting message to the displaying terminal;
receiving a responding message from the displaying terminal;
executing computer-executable codes related to the RTCPeerConnection interface; and
establishing the point to point communication link with the displaying terminal.

7. The method of claim 6, wherein the using the screen visiting interface provided by the web-based OS to retrieve the screen content comprises:
defining and initializing a MediaStream interface; and
accessing the screen content through the MediaStream interface.

8. The method of claim 7, wherein the sending the screen content data to the displaying terminal through the point to point communication link comprises:
sending the screen content data to the RTCPeerConnection interface; and
sending the screen content data to the displaying terminal through the point to point communication link from the RTCPeerConnection interface.

9. The method of claim 1, wherein the point to point communication link includes at least one of the following:
a wired communication link in a local area network (LAN);
a wireless communication link established through WiFi or Bluetooth in the LAN; or
a remote point-to-point communication link established through Internet.

10. A method for displaying a screen content by a displaying terminal, the method comprising:
registering the displaying terminal at a web server, the registering the displaying terminal at the web server including:
loading computer-executable codes for initialization from the web server to the displaying terminal;
executing the computer-executable codes for initialization at the displaying terminal to establish a web-based operating system (OS) that supports a real-time webpage communication; and
sending device information of the displaying terminal to the web server, the device information of the displaying terminal including a screen resolution of the displaying terminal;
establishing a point to point communication link with a projecting terminal through a point to point link interface provided by the web-based OS at the displaying terminal; and
displaying screen content data received from the projecting terminal at a screen, the displaying including:
converting the screen content data into a format supported by the web-based OS, the converting including:
converting the screen content data into an OGG format in response to determining that the screen content is an audio signal; and
converting the screen content data into a WEBM format or a MP4 format in response to determining that the screen content is a video signal.

11. The method of claim 10, wherein the displaying the screen content data received from the projecting terminal at the screen comprises using a video control provided by the web-based OS to display the screen content data.

12. The method of claim 10, wherein the registering the displaying terminal at the web server further includes:
prior to the establishing the point to point communication link with the projecting terminal through the point to point link interface provided by the web-based OS, visiting the web server through the web-based OS.

13. The method of claim 10, wherein the registering the displaying terminal at the web server further includes:
uploading registration related information of the displaying terminal to the web server through the web-based OS that completes initialization; and
completing a registration.

14. The method of claim 10, wherein the web-based OS supports HyperText Markup Language (HTML) 5 operating environment with a web Real-Time Communication (WebRTC) application.

15. The method of claim 14, wherein the establishing the point to point communication link with the projecting terminal through the point to point link interface provided by the web-based OS at the displaying terminal comprises:
defining an RTCPeerConnection interface through the web-based OS;
completing an initiation of the RTCPeerConnection interface;
receiving a point to point connecting message from the projecting terminal;
returning a responding message to the projecting terminal;
executing computer-executable codes related to the RTCPeerConnection interface; and
establishing the point to point communication link with the projecting terminal.

16. The method of claim 15, wherein the displaying screen content data received from the projecting terminal at the screen comprises using a content displaying control provided by the web-based OS to display the screen content data at the screen.

17. The method of claim 16, wherein the using the content displaying control provided by the web-based OS to display the screen content data at the screen comprises:
defining and initializing a video control;
using the content displaying control to retrieve the screen content data received from the RTCPeerConnection interface;
selecting a screen resolution to display the screen content data; and
using the video control to display the screen content data at the screen according to the screen resolution.

18. The method of claim 17, wherein the screen resolution includes at least one of the following:
- a screen resolution of the projecting terminal;
- a screen resolution of the displaying terminal; or
- a screen resolution defined by a user.

19. An apparatus comprising:
one or more processors; and
one or more memories stored thereon computer-readable instructions that, when executed by one or more processors, cause the one or more processors to perform acts comprising:
- connecting a projecting terminal and a displaying terminal to a same local area network (LAN) or a router;
- sending computer-executable codes for initialization from a web server to the projecting terminal and the displaying terminal respectively to establish a web-based operating system (OS) that supports a real-time webpage communication at the projecting terminal and the displaying terminal respectively;
- establishing a point-to-point communication link through a point-to-point communication interface provided by the web-based OS between the projecting terminal and the displaying terminal;
- converting the screen content, when the projecting terminal uses a screen visiting interface provided by the web-based OS to access the screen content, into screen content data in real-time supported by the web-based OS, the converting including:
  - converting the screen content into an OGG format in response to determining that the screen content is an audio signal; and
  - converting the screen content into a WEBM format or a MP4 format in response to determining that the screen content is a video signal, the converting the screen convent into the WEBM format or the MP4 format including:
    - converting the screen content into the MP4 format in response to determining that the displaying terminal does not support the WEBM format;
- receiving a designated screen resolution to display the screen content data;
- sending the screen content data to the displaying terminal through the point-to-point communication link; and
- using a content displaying control provided by the web-based OS, when the displaying terminal receives the screen content data, to display the screen content data onto a screen.

20. The apparatus of claim 19, wherein the acts further comprise:
- establishing a connection between the displaying terminal or the project terminal and the web server respectively through the web-based OS operating environments; and
- when the projecting terminal or the displaying terminal visits the web server, loading computer-readable codes or logical codes that are required for registration and initialization of the projecting terminal or the displaying terminal from the web server, and executing the computer-executable codes relating to registration and initialization.

* * * * *